United States Patent
Tsao et al.

(10) Patent No.: US 7,293,340 B1
(45) Date of Patent: Nov. 13, 2007

(54) DIRECT DRIVE SPINDLE, MACHINING CENTER AND METHODS OF FABRICATING THE SAME

(75) Inventors: Hsiang-Yuan Tsao, Taichung County (TW); Chun-Chieh Lin, Taichung County (TW)

(73) Assignee: Roundtop Machinery Industries Co., Ltd, Taichung County (TW)

( * ) Notice: Subject to any disclaimer, the term of this patent is extended or adjusted under 35 U.S.C. 154(b) by 0 days.

(21) Appl. No.: 11/724,271

(22) Filed: Mar. 15, 2007

(30) Foreign Application Priority Data

Dec. 15, 2006 (TW) .............................. 95147168 A

(51) Int. Cl.
  *B23P 15/00* (2006.01)
  *B23C 1/12* (2006.01)
(52) U.S. Cl. .................... 29/428; 29/469; 409/201; 409/216
(58) Field of Classification Search .............. 409/201, 409/211, 216; 408/236; 901/23–24; 29/428, 29/469
See application file for complete search history.

(56) References Cited

U.S. PATENT DOCUMENTS

| | | | |
|---|---|---|---|
| 3,460,435 A * | 8/1969 | Julius et al. ............... | 409/183 |
| 3,483,796 A * | 12/1969 | Maso et al. ................ | 409/216 |
| 4,592,684 A | 6/1986 | Baker | |
| 4,712,973 A | 12/1987 | Garin et al. | |
| 4,943,748 A | 7/1990 | Shiozawa | |
| 4,993,138 A | 2/1991 | Yang | |
| 4,999,533 A | 3/1991 | King et al. | |
| 5,068,556 A | 11/1991 | Lykes et al. | |
| 5,155,423 A | 10/1992 | Karlen et al. | |
| 5,231,264 A | 7/1993 | Fujita | |
| 5,234,081 A | 8/1993 | Watanabe | |
| 5,257,883 A | 11/1993 | Armando | |
| 5,385,436 A * | 1/1995 | Corsi ........................ | 409/201 |
| 5,391,970 A | 2/1995 | Chaffee et al. | |

(Continued)

*Primary Examiner*—Erica Cadugan
(74) *Attorney, Agent, or Firm*—Reed Smith LLP; Stanley P. Fisher, Esq.; Juan Carlos A. Marquez, Esq.

(57) ABSTRACT

This invention discloses a direct drive spindle assembly including a main fork formed by a base and a parallel pair of spaced fork arms and rotated about a first rotational axis. Moreover, the direct drive spindle assembly includes a first drive established by a hollow housing, a first motor stator and a first motor rotor, wherein the first motor rotor coupled with the base of the main fork drives the main fork to rotate about the first rotational axis. Furthermore, the direct drive spindle assembly includes a second drive contained in a room between the fork arms of the main fork and established by a second motor stator concentric with a second rotational axis, a second motor rotor and a rotor transmission ring, wherein the second rotational axis is perpendicular to the first rotational axis and the second motor stator is coupled with the fork arms of the main fork. In addition, the direct drive spindle assembly includes a spindle box having an orthogonal cross structure. A first arm of the rotor transmission ring is coupled with the second motor rotor and a second arm of the structure is connected to a spindle head. The feature of the present invention is that after the second drive is fit in the room between the above-mentioned paired fork arms of the main fork and then combined with the base of the main fork and firmly locked in the right position, the whole structure can achieve preferred precision.

20 Claims, 4 Drawing Sheets

U.S. PATENT DOCUMENTS

| | | |
|---|---|---|
| 5,392,977 A | 2/1995 | Kato |
| 5,394,335 A | 2/1995 | Rush |
| 5,584,621 A | 12/1996 | Bertsche et al. |
| 5,718,545 A | 2/1998 | Husted |
| 5,850,770 A | 12/1998 | Rehage |
| 5,996,329 A | 12/1999 | Cardenas |
| 6,019,013 A | 2/2000 | Luik |
| 6,669,416 B2 | 12/2003 | Klement |
| 6,874,213 B2 | 4/2005 | Prust et al. |
| 6,902,362 B2 | 6/2005 | Ferrari et al. |
| 6,944,923 B2 | 9/2005 | Geissler et al. |
| 6,951,440 B2 | 10/2005 | Piccolo |
| 7,065,848 B2 | 6/2006 | Robotta et al. |
| 2007/0059116 A1 * | 3/2007 | Brunemann ................ 409/201 |

* cited by examiner

```
┌─────────────────────────────────────────────────────────────┐
│ Providing a main fork which is rotated about a first        │
│ rotational axis and formed by a base 6 and a parallel pair  │
│ of spaced fork arms 7                                        │
└─────────────────────────────────────────────────────────────┘
                              ↓
┌─────────────────────────────────────────────────────────────┐
│ Providing a first drive means which is established by a     │
│ hollow housing 1, a first motor stator 2 and a first motor  │
│ rotor 3, wherein the first motor rotor 3 coupled with the   │
│ base 6 of the main fork drives the main fork to rotate      │
│ about the first rotational axis                              │
└─────────────────────────────────────────────────────────────┘
                              ↓
┌─────────────────────────────────────────────────────────────┐
│ Providing a second drive means which is contained between   │
│ the fork arms 7 of the main fork and established by a       │
│ second motor stator 9 concentric with a second rotational   │
│ axis, a second motor rotor 10 and a rotor transmission      │
│ ring 11, wherein the second rotational axis is              │
│ perpendicular to the first rotational axis and the second   │
│ motor stator 9 is coupled with the fork arms 7 of the       │
│ main fork                                                    │
└─────────────────────────────────────────────────────────────┘
                              ↓
┌─────────────────────────────────────────────────────────────┐
│ Providing a spindle box 13 having an orthogonal cross       │
│ structure wherein a first arm of the rotor transmission     │
│ ring 11 is coupled with the second motor rotor 10 by means  │
│ of the rotor transmission ring 11 and a second arm of the   │
│ structure is connected to a spindle head                    │
└─────────────────────────────────────────────────────────────┘
                              ↓
┌─────────────────────────────────────────────────────────────┐
│ Combining the above-mentioned paired fork arms 7            │
│ with the base 6 of the main fork in a right position        │
└─────────────────────────────────────────────────────────────┘
```

Figure 5

DIRECT DRIVE SPINDLE, MACHINING CENTER AND METHODS OF FABRICATING THE SAME

BACKGROUND OF THE INVENTION

1. Field of the Invention

The present invention relates to a machining center and a method for manufacturing the same, and more particularly, to a machining center having a spindle head equipped with direct-drive transmission components.

2. Description of the Prior Art

According to the known technique regarding conventional multi-axis machining centers, intermediate transmission components such as a timing belt units, gear-rack units, worm-gear units, bevel gear units, spur gear units, or combinations of said units are typically implemented for operatively connecting a spindle head and a distant spindle motor which drives the spindle head. To satisfy machining requirements of complex surface structures of machine dies or aero parts, the spindle head has to be kept at a particular angle with respect to the surface being machined throughout the machining process. Once the contour variation of the surface being machined occurs, adjustment is required by spindle head to maintain the required angular relationship between the spindle head and the machined surface.

To such a conventional spindle head assembly with the presence of the intermediate transmission component as preciously discussed, the machining efficiency thereof can be significantly limited because the spindle head has to be slowed down from a preset cutting speed before being imparted with a currently required operational angle and then be sped up to the preset cutting speed to proceed with the machining work. As direct drive spindle assemblies eliminate the need of intermediate transmission components, much recent interest has been directed towards the development thereof. For instance, U.S. Pat. No. 5,584,621 has disclosed a direct drive spindle assembly comprising a pair of mutually perpendicular direct drive motor assemblies so that the spindle head is allowed to be kept at a particular angle with respect to the surface being machined despite contour variation of the machining piece. However, each the motor assembly thereof has its stator disposed outside the rotor and this causes difficult fabrication. Particular to the motor assembly with respect to axis A, all the components have to be configured and installed in sequence from the fork arms toward the center therebetween. Also, since the fork arms are cast into an integral body and possess less adjustability, it is difficult to achieve precise assembly and operation. Therefore the problems of poor control of precision and oil-leakage during operation may occur frequently. Dissimilarly, U.S. Pat. No. 6,669,416 has taught another type of direct drive spindle head characterized by the external rotor motors it implements for both the axes of rotation. Nevertheless, the included angle between the two rotational axes is 45 degree and is detrimental to the machining precision as well as the mechanical strength.

Thus, a need exists for a direct drive spindle assembly, which is advantaged by its easy assembly, alleviated oil-leakage during operation, improved mechanical strength and reduced power transmission loss.

SUMMARY OF THE INVENTION

The present invention has been accomplished under these circumstances in view and herein provides a direct drive spindle assembly comprising a main fork that is formed by a base and a parallel pair of spaced fork arms combined with the base and rotated about a first rotational axis. Further, the direct drive spindle assembly has a first drive means which is established by a hollow housing, a first motor stator and a first motor rotor accommodated in the first motor stator, wherein the first motor rotor coupled with the base of the main fork drives the main fork to rotate about the first rotational axis. Additionally, the direct drive spindle assembly has a second drive means which is contained in said fork arms of the main fork and established by a second motor stator concentric with a second rotational axis, a second motor rotor and a rotor transmission ring, wherein the second motor rotor is accommodated in the second motor stator concentric. The second rotational axis is perpendicular to the first rotational axis and the second motor stator is coupled with the fork arms of the main fork. Further, the direct drive spindle assembly comprises a spindle box having an orthogonal cross structure, whereupon a first arm of the rotor transmission ring is coupled with the second motor rotor and a second arm of the structure is connected to a spindle head.

Accordingly, it is one objective of the present invention to provide a direct drive spindle assembly, which allows operational angle adjustment under high rotation speed and is able to respond to abrupt and continuous contour variation of the surface being machined.

It is another objective of the present invention to provide a direct drive spindle assembly, which can be assembled easily and alleviates oil-leakage.

It is another objective of the present invention to provide a direct drive spindle assembly, which performs preferable mechanical strength.

It is another objective of the present invention to provide a direct drive spindle assembly, which reduces power transmission loss.

It is another objective of the present invention to provide a method for manufacturing a direct drive spindle assembly, which allows operational angle adjustment under high rotation speed and is able to respond to abrupt and continuous contour variation of the surface being machined.

It is another objective of the present invention to provide a method for manufacturing a direct drive spindle assembly, which can be assembled easily and alleviates oil-leakage.

It is another objective of the present invention to provide a method for manufacturing a direct drive spindle assembly, which performs preferable mechanical strength.

It is another objective of the present invention to provide a method for manufacturing a direct drive spindle assembly, which reduces power transmission loss.

It is another objective of the present invention to provide a vertical machining center equipped with a direct drive spindle assembly, wherein the direct drive spindle assembly allows operational angle adjustment under high rotation speed and is able to respond to abrupt and continuous contour variation of the surface being machined.

It is another objective of the present invention to provide a vertical machining center equipped with a direct drive spindle assembly, wherein the direct drive spindle assembly can be assembled easily and alleviates oil-leakage.

It is another objective of the present invention to provide a vertical machining center equipped with a direct drive spindle assembly, wherein the direct drive spindle assembly performs preferable mechanical strength.

It is another objective of the present invention to provide a vertical machining center equipped with a direct drive spindle assembly, wherein the direct drive spindle assembly reduces power transmission loss.

It is another objective of the present invention to provide a horizontal machining center equipped with a direct drive spindle assembly, wherein the direct drive spindle assembly allows operational angle adjustment under high rotation speed and is able to respond to abrupt and continuous contour variation of the surface being machined.

It is another objective of the present invention to provide a horizontal machining center equipped with a direct drive spindle assembly, wherein the direct drive spindle assembly can be assembled easily and alleviates oil-leakage.

It is another objective of the present invention to provide a horizontal machining center equipped with a direct drive spindle assembly, wherein the direct drive spindle assembly performs preferable mechanical strength.

It is another objective of the present invention to provide a horizontal machining center equipped with a direct drive spindle assembly, wherein the direct drive spindle assembly reduces power transmission loss.

It is another objective of the present invention to provide a crossrail movable type double column machining center equipped with a direct drive spindle assembly, wherein the direct drive spindle assembly allows operational angle adjustment under high rotation speed and is able to respond to abrupt and continuous contour variation of the surface being machined.

It is another objective of the present invention to provide a crossrail movable type double column machining center equipped with a direct drive spindle assembly, wherein the direct drive spindle assembly can be assembled easily and alleviates oil-leakage.

It is another objective of the present invention to provide a crossrail movable type double column machining center equipped with a direct drive spindle assembly, wherein the direct drive spindle assembly performs preferable mechanical strength.

It is another objective of the present invention to provide a crossrail movable type double column machining center equipped with a direct drive spindle assembly, wherein the direct drive spindle assembly reduces power transmission loss.

It is another objective of the present invention to provide a crossrail fixed type double column machining center equipped with a direct drive spindle assembly, wherein the direct drive spindle assembly allows operational angle adjustment under high rotation speed and is able to respond to abrupt and continuous contour variation of the surface being machined.

It is another objective of the present invention to provide a crossrail fixed type double column machining center equipped with a direct drive spindle assembly, wherein the direct drive spindle assembly can be assembled easily and alleviates oil-leakage.

It is another objective of the present invention to provide a crossrail fixed type double column machining center equipped with a direct drive spindle assembly, wherein the direct drive spindle assembly performs preferable mechanical strength.

It is another objective of the present invention to provide a crossrail fixed type double column machining center equipped with a direct drive spindle assembly, wherein the direct drive spindle assembly reduces power transmission loss.

It is another objective of the present invention to provide a vertical & horizontal machining center equipped with a direct drive spindle assembly, wherein the direct drive spindle assembly allows operational angle adjustment under high rotation speed and is able to respond to abrupt and continuous contour variation of the surface being machined.

It is another objective of the present invention to provide a vertical & horizontal machining center equipped with a direct drive spindle assembly, wherein the direct drive spindle assembly can be assembled easily and alleviates oil-leakage.

It is still another objective of the present invention to provide a vertical & horizontal machining center equipped with a direct drive spindle assembly, wherein the direct drive spindle assembly performs preferable mechanical strength.

It is yet another objective of the present invention to provide a vertical & horizontal machining center equipped with a direct drive spindle assembly, wherein the direct drive spindle assembly reduces power transmission loss.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein:

FIG. 5 is a schematic flow chart describing the method for manufacturing the direct drive spindle assembly according to the present invention.

DESCRIPTION OF THE PREFERRED EMBODIMENT

It is to be noted that the fundamental principle as well as basic structure of a machining center where the disclosed spindle assembly of the present invention is related to are well know to those ordinarily skilled in the art and need not be discussed at any length herein. Furthermore, the accompanying drawings are provided for schematically showing the structural characters of the present invention and are not necessarily drawn to scale.

Figure 1:
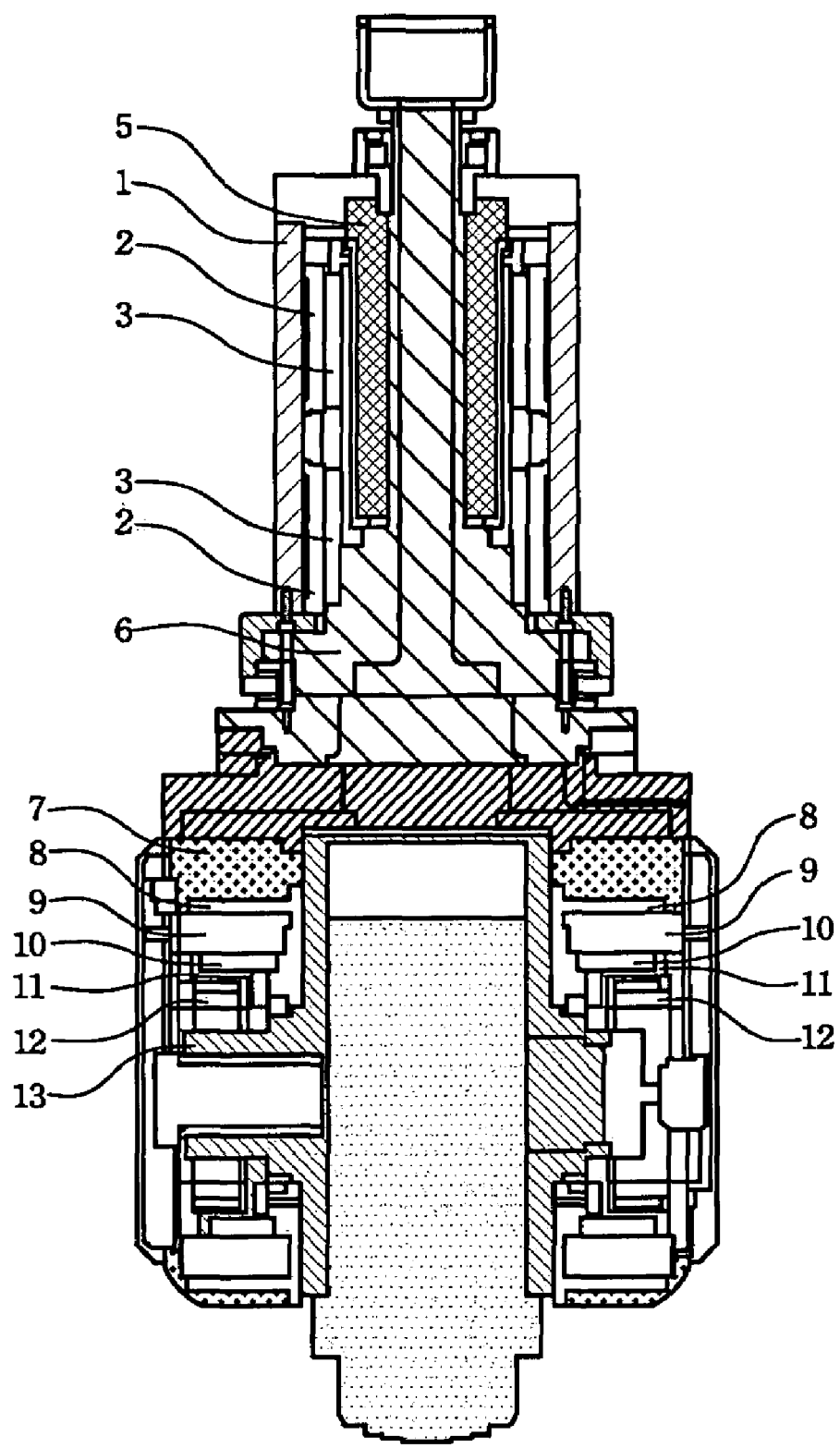
FIG. 1 is a schematic cross sectional view of the direct drive spindle assembly of the present invention.

Now referring to FIG. 1, a direct drive spindle assembly according to one embodiment of the present invention primarily comprises a main fork, a first drive means, a second drive means and a spindle box 13 wherein the main fork is formed by a base 6 and a parallel pair of spaced fork arms 7 and rotated about a first rotational axis.

Figure 2:
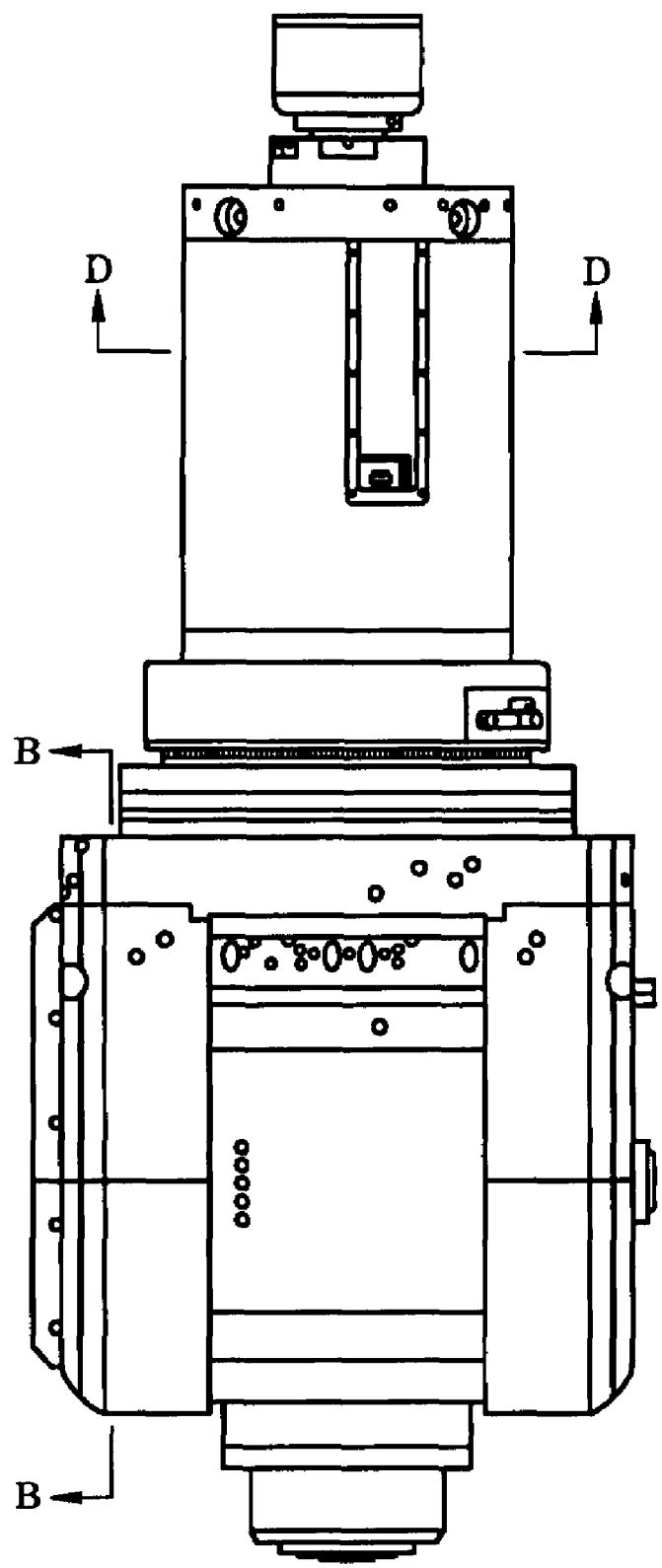
FIG. 2 is a schematic drawing showing the direct drive spindle assembly of the present invention.
Figure 3:
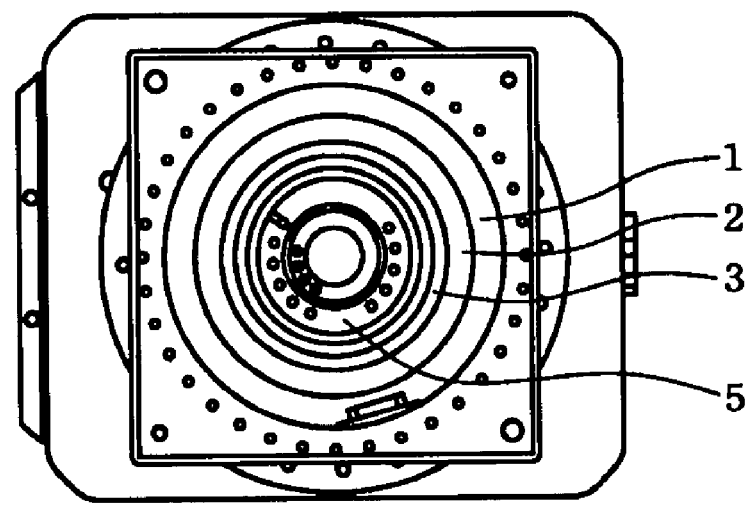
FIG. 3 is a schematic cross sectional view taken along Line D-D of FIG. 2 for illustrating the first rotational axis of the disclosed direct drive spindle assembly.

As can be seen in FIGS. 2 and 3, the first drive means is established by a hollow housing 1 which is concentric with a first rotational axis, a first motor stator 2 and a first motor rotor 3, wherein the first motor rotor 3 coupled with the base 6 of the main fork drives the main fork to rotate about the first rotational axis.

Figure 4:
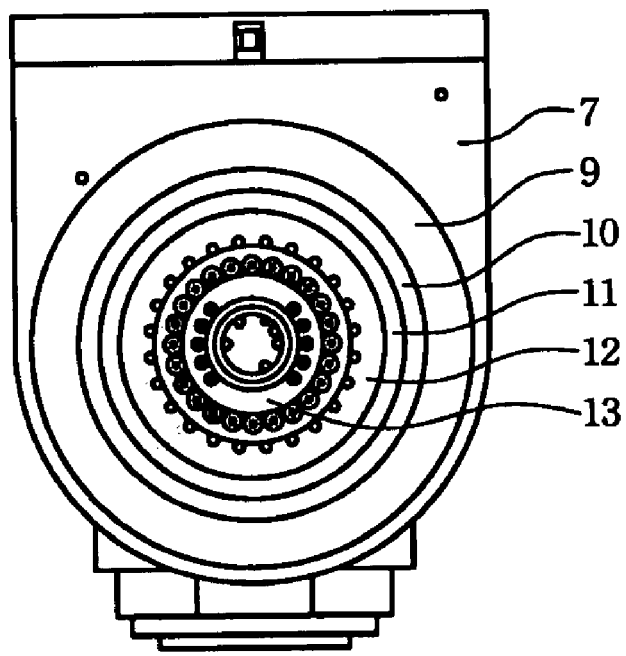
FIG. 4 is a schematic cross sectional view taken along Line B-B of FIG. 2 for illustrating the second rotational axis of the disclosed direct drive spindle assembly.

Reference is now made to FIGS. 2 and 4. The second drive means is contained in said fork arms 7 of the main fork and established by a second motor stator 9 concentric with a second rotational axis, a second motor rotor 10 and a rotor transmission ring 11, wherein the second rotational axis is perpendicular to the first rotational axis and the second motor stator 9 is coupled with the fork arms 7 of the main fork. Since the fork arms 7 are assembled to the base 6 instead of being formed integrally therewith, a preferred precision is therefore achieved. Also, the spindle box 13 has an orthogonal cross structure, whereupon a first arm of the rotor transmission ring 11 is coupled with the second motor rotor 10 and a second arm of the structure is connected to a spindle head.

According to the presently discussed embodiment, the first motor stator 2 and the first motor rotor 3 are both accommodated in the hollow housing 1 of the first drive means, and the first motor rotor 3 is further accommodated in the first motor stator 2. Additionally, the rotor transmission ring 11 is accommodated in the second motor stator 9 and the second motor rotor 10 while the second motor rotor 10 is further accommodated in the second motor stator 9.

Furthermore, the fork arms 7 of the main fork comprise respectively an axis hole provided along the direction of the second rotational axis for receiving the second drive means.

Moreover, in this embodiment, a first brake structure 5 is provided within the first motor rotor 3 and a second brake structure 12 is provided within the second motor rotor 10.

Also, the disclosed direct drive spindle assembly further comprises a first motor stator cooling structure installed inside the hollow housing 1 between the first motor stator 2 and the first rotational axis. Additionally, a second motor stator cooling structure 8 is installed between the second motor stator 9 and the fork arms 7 of the main fork.

Please refer to FIG. 5 for a second embodiment of the present invention that relates to a method for manufacturing a direct drive spindle assembly, wherein the following steps are included:

providing a main fork which is rotated about a first rotational axis and formed by a base 6 and a parallel pair of spaced fork arms 7;

providing a first drive means which is established by a hollow housing 1, a first motor stator 2 and a first motor rotor 3, wherein the first motor rotor 3 coupled with the base 6 of the main fork drives the main fork to rotate about the first rotational axis;

providing a second drive means which is contained between the fork arms 7 of the main fork and established by a second motor stator 9 concentric with a second rotational axis, a second motor rotor 10 and a rotor transmission ring 11, wherein the second rotational axis is perpendicular to the first rotational axis and the second motor stator 9 is coupled with the fork arms 7 of the main fork;

providing a spindle box 13 having an orthogonal cross structure wherein a first arm of the rotor transmission ring 11 is coupled with the second motor rotor 10 by means of the rotor transmission ring 11 and a second arm of the structure is connected to a spindle head; and combining the above-mentioned paired fork arms 7 with the base 6 of the main fork in a right position.

In the presently provided embodiment, the first motor stator 2 and the first motor rotor 3 are both accommodated in the hollow housing 1 of the first drive means, and the first motor rotor 3 is further accommodated in the first motor stator 2. In addition, the rotor transmission ring 11 is accommodated in the second motor stator 9 and the second motor rotor 10 while the second motor rotor 10 is further accommodated in the second motor stator 9. Besides, the second motor stator 9 and the second motor rotor 10 are assembled before installed between the fork arms 7 of the main fork.

Also according to the same embodiment, the fork arms 7 of the main fork comprise respectively an axis hole provided along the direction of the second rotational axis for receiving the second drive means.

Moreover, in the present embodiment, a first brake structure 5 is provided within the first motor rotor 3 and a second brake structure 12 is provided within the second motor rotor 10.

Also, the disclosed direct drive spindle assembly further comprises a first motor stator cooling structure installed inside the hollow housing 1 between the first motor stator 2 and the first rotational axis. Additionally, a second motor stator cooling structure 8 is installed between the second motor stator 9 and the fork arms 7 of the main fork.

The present invention herein provides a third embodiment regarding a vertical machining center comprising a direct drive spindle assembly, which is characterized by the direct drive spindle assembly having a main fork, a first drive means, a second drive means and a spindle box 13 wherein the main fork is formed by a base 6 and a parallel pair of spaced fork arms 7 and rotated about a first rotational axis. As can be seen in FIGS. 2 and 3, the first drive means is established by a hollow housing 1 which is concentric with a first rotational axis, a first motor stator 2 and a first motor rotor 3, wherein the first motor rotor 3 coupled with the base 6 of the main fork drives the main fork to rotate about the first rotational axis. The description is now referred to FIGS. 2 and 4 wherein it can be seen that the second drive means is contained between said fork arms 7 of the main fork and established by a second motor stator 9 concentric with a second rotational axis, a second motor rotor 10 and a rotor transmission ring 11, wherein the second rotational axis is perpendicular to the first rotational axis and the second motor stator 9 is coupled with the fork arms 7 of the main fork. Since the fork arms 7 are assembled to the base 6 instead of being formed integrally therewith, a preferred precision is therefore achieved. Also, the spindle box 13 has an orthogonal cross structure, whereupon a first arm of the rotor transmission ring 11 is coupled with the second motor rotor 10 and a second arm of the structure is connected to a spindle head.

According to the presently discussed embodiment, the first motor stator 2 and the first motor rotor 3 are both accommodated in the hollow housing 1 of the first drive means, and the first motor rotor 3 is further accommodated in the first motor stator 2. Additionally, the rotor transmission ring 11 is accommodated in the second motor stator 9 and the second motor rotor 10 while the second motor rotor 10 is further accommodated in the second motor stator 9.

Furthermore, the fork arms 7 of the main fork comprise respectively an axis hole provided along the direction of the second rotational axis for receiving the second drive means.

Moreover, in this embodiment, a first brake structure 5 is provided within the first motor rotor 3 and a second brake structure 12 is provided within the second motor rotor 10.

Also, the disclosed direct drive spindle assembly further comprises a first motor stator cooling structure installed inside the hollow housing 1 between the first motor stator 2 and the first rotational axis. Additionally, a second motor stator cooling structure 8 is installed between the second motor stator 9 and the fork arms 7 of the main fork.

The present invention herein provides a fourth embodiment regarding a horizontal machining center comprising a direct drive spindle assembly, which is characterized by the direct drive spindle assembly having a main fork, a first drive means, a second drive means and a spindle box 13 wherein the main fork is formed by a base 6 and a parallel pair of spaced fork arms 7 and rotated about a first rotational axis. As can be seen in FIGS. 2 and 3, the first drive means is established by a hollow housing 1 which is concentric with a first rotational axis, a first motor stator 2 and a first motor rotor 3, wherein the first motor rotor 3 coupled with the base 6 of the main fork drives the main fork to rotate about the first rotational axis. The description is now referred to in FIGS. 2 and 4 where it can be seen that the second drive means is contained between said fork arms 7 of the main fork and established by a second motor stator 9 concentric with a second rotational axis, a second motor rotor 10 and a rotor transmission ring 11, wherein the second rotational axis is perpendicular to the first rotational axis and the second motor stator 9 is coupled with the fork arms 7 of the main fork. Since the fork arms 7 are assembled to the base 6 instead of being formed integrally therewith, a preferred precision is therefore achieved. Also, the spindle box 13 has an orthogonal cross structure, whereupon a first arm of the rotor transmission ring 11 is coupled with the second motor rotor 10 and a second arm of the structure is connected to a spindle head.

According to the presently discussed embodiment, the first motor stator 2 and the first motor rotor 3 are accommodated in the hollow housing 1 of the first drive means, and the first motor rotor 3 is further accommodated in the first motor stator 2. Additionally, the rotor transmission ring 11 is accommodated in the second motor stator 9 and the second motor rotor 10 while the second motor rotor 10 is further accommodated in the second motor stator 9.

Furthermore, the fork arms 7 of the main fork comprise respectively an axis hole provided along the direction of the second rotational axis for receiving the second drive means.

Moreover, in this embodiment, a first brake structure 5 is provided within the first motor rotor 3 and a second brake structure 12 is provided within the second motor rotor 10.

Also, the disclosed direct drive spindle assembly further comprises a first motor stator cooling structure installed inside the hollow housing 1 between the first motor stator 2 and the first rotational axis. Additionally, a second motor stator cooling structure 8 is installed between the second motor stator 9 and the fork arms 7 of the main fork.

The present invention herein provides a fifth embodiment regarding a crossrail movable type double column machining center (D.M.C.) comprising a direct drive spindle assembly, which is characterized by the direct drive spindle assembly having a main fork, a first drive means, a second drive means and a spindle box 13 wherein the main fork is formed by a base 6 and a parallel pair of spaced fork arms 7 and rotated about a first rotational axis. As can be seen in FIGS. 2 and 3, the first drive means is established by a hollow housing 1 which is concentric with a first rotational axis, a first motor stator 2 and a first motor rotor 3, wherein the first motor rotor 3 coupled with the base 6 of the main fork drives the main fork to rotate about the first rotational axis. The description is now referred to in FIGS. 2 and 4 where it can be seen that the second drive means is contained between said fork arms 7 of the main fork and established by a second motor stator 9 concentric with a second rotational axis, a second motor rotor 10 and a rotor transmission ring 11, wherein the second rotational axis is perpendicular to the first rotational axis and the second motor stator 9 is coupled with the fork arms 7 of the main fork. Since the fork arms 7 are assembled to the base 6 instead of being formed integrally therewith, preferred precision is therefore achieved. Also, the spindle box 13 has an orthogonal cross structure, whereupon a first arm of the rotor transmission ring 11 is coupled with the second motor rotor 10 and a second arm of the structure is connected to a spindle head.

According to the presently discussed embodiment, the first motor stator 2 and the first motor rotor 3 are accommodated in the hollow housing 1 of the first drive means, and the first motor rotor 3 is further accommodated in the first motor stator 2. Additionally, the rotor transmission ring 11 is accommodated in the second motor stator 9 and the second motor rotor 10 while the second motor rotor 10 is further accommodated in the second motor stator 9.

Furthermore, the fork arms 7 of the main fork comprise respectively an axis hole provided along the direction of the second rotational axis for receiving the second drive means.

Moreover, in this embodiment, a first brake structure 5 is provided within the first motor rotor 3 and a second brake structure 12 is provided within the second motor rotor 10.

Also, the disclosed direct drive spindle assembly further comprises a first motor stator cooling structure installed inside the hollow housing 1 between the first motor stator 2 and the first rotational axis. Additionally, a second motor stator cooling structure 8 is installed between the second motor stator 9 and the fork arms 7 of the main fork.

The present invention herein provides a sixth embodiment regarding a crossrail fixed type double column machining center (D.M.C.) comprising a direct drive spindle assembly, which is characterized by the direct drive spindle assembly having a main fork, a first drive means, a second drive means and a spindle box 13 wherein the main fork is formed by a base 6 and a parallel pair of spaced fork arms 7 and rotated about a first rotational axis. As can be seen in FIGS. 2 and 3, the first drive means is established by a hollow housing 1 which is concentric with a first rotational axis, a first motor stator 2 and a first motor rotor 3, wherein the first motor rotor 3 coupled with the base 6 of the main fork drives the main fork to rotate about the first rotational axis. The description is now referred to in FIGS. 2 and 4 where it can be seen that the second drive means is contained between said fork arms 7 of the main fork and established by a second motor stator 9 concentric with a second rotational axis, a second motor rotor 10 and a rotor transmission ring 11, wherein the second rotational axis is perpendicular to the first rotational axis and the second motor stator 9 is coupled with the fork arms 7 of the main fork. Since the fork arms 7 are assembled to the base 6 instead of being formed integrally therewith, preferred precision is therefore achieved. Also, the spindle box 13 has an orthogonal cross structure, whereupon a first arm of the rotor transmission ring 11 is coupled with the second motor rotor 10 and a second arm of the structure is connected to a spindle head.

According to the presently discussed embodiment, the first motor stator 2 and the first motor rotor 3 are accommodated in the hollow housing 1 of the first drive means, and the first motor rotor 3 is further accommodated in the first motor stator 2. Additionally, the rotor transmission ring 11 is accommodated in the second motor stator 9 and the second motor rotor 10 while the second motor rotor 10 is further accommodated in the second motor stator 9.

Furthermore, the fork arms 7 of the main fork comprise respectively an axis hole provided along the direction of the second rotational axis for receiving the second drive means.

Moreover, in this embodiment, a first brake structure 5 is provided within the first motor rotor 3 and a second brake structure 12 is provided within the second motor rotor 10.

Also, the disclosed direct drive spindle assembly further comprises a first motor stator cooling structure installed inside the hollow housing 1 between the first motor stator 2 and the first rotational axis. Additionally, a second motor stator cooling structure 8 is installed between the second motor stator 9 and the fork arms 7 of the main fork.

The present invention herein provides a seventh embodiment regarding a vertical & horizontal machining center comprising a direct drive spindle assembly, which is characterized by the direct drive spindle assembly having a main fork, a first drive means, a second drive means and a spindle box 13 wherein the main fork is formed by a base 6 and a parallel pair of spaced fork arms 7 and rotated about a first rotational axis. As can be seen in FIGS. 2 and 3, the first drive means is established by a hollow housing 1 which is concentric with a first rotational axis, a first motor stator 2 and a first motor rotor 3, wherein the first motor rotor 3 coupled with the base 6 of the main fork drives the main fork to rotate about the first rotational axis. The description is now referred to in FIGS. 2 and 4 where it can be seen that the second drive means is contained between said fork arms 7 of the main fork and established by a second motor stator 9 concentric with a second rotational axis, a second motor rotor 10 and a rotor transmission ring 11, wherein the second rotational axis is perpendicular to the first rotational axis and the second motor stator 9 is coupled with the fork arms 7 of the main fork. Since the fork arms 7 are assembled to the base 6 instead of being formed integrally therewith, preferred precision is therefore achieved. Also, the spindle box 13 has an orthogonal cross structure, whereupon a first arm of the rotor transmission ring 11 is coupled with the second motor rotor 10 and a second arm of the structure is connected to a spindle head.

According to the presently discussed embodiment, the first motor stator 2 and the first motor rotor 3 are accommodated in the hollow housing 1 of the first drive means, and the first motor rotor 3 is further accommodated in the first motor stator 2. Additionally, the rotor transmission ring 11 is accommodated in the second motor stator 9 and the second motor rotor 10 while the second motor rotor 10 is further accommodated in the second motor stator 9.

Furthermore, the fork arms 7 of the main fork comprise respectively an axis hole provided along the direction of the second rotational axis for receiving the second drive means.

Moreover, in this embodiment, a first brake structure 5 is provided within the first motor rotor 3 and a second brake structure 12 is provided within the second motor rotor 10.

Also, the disclosed direct drive spindle assembly further comprises a first motor stator cooling structure installed inside the hollow housing 1 between the first motor stator 2 and the first rotational axis. Additionally, a second motor stator cooling structure 8 is installed between the second motor stator 9 and the fork arms 7 of the main fork.

Although the particular embodiments of the invention has been described in details for purposes of illustration, various modifications and enhancements may be made without departing from the spirit and scope of the invention. Accordingly, the invention is not to be limited except as by the appended claims.

What is claimed is:

1. A direct drive spindle assembly comprising:
   a main fork which is rotated about a first rotational axis and has a base and a parallel pair of spaced fork arms;
   a first drive means comprising a hollow housing concentric with the first rotational axis, a first motor stator and a first motor rotor that is accommodated in the first motor stator and is coupled with the base of the main fork for driving the main fork to rotate about the first rotational axis;
   a second drive means contained in a room between the fork arms of the main fork and having a second motor stator concentric with a second rotational axis, a second motor rotor and a rotor transmission ring inside the second motor rotor, wherein the second rotational axis is perpendicular to the first rotational axis and the second motor stator is coupled with the fork arms of the main fork; and
   a spindle box having an orthogonal cross-shaped structure of which a first arm is coupled with the second motor rotor by means of the rotor transmission ring, and of which spindle box a second arm is connected to a spindle head; which is characterized by that the above-mentioned paired fork arms are assembled to the second drive means before being combined with the base of the main fork.

2. The direct drive spindle assembly according to claim 1, wherein the first motor stator and the first motor rotor accommodated in the first motor stator are both accommodated in the hollow housing of the first drive means.

3. The direct drive spindle assembly according to claim 1, wherein the fork arms of the main fork comprise respectively an axis hole provided along the direction of the second rotational axis for receiving the second drive means.

4. The direct drive spindle assembly according to claim 1, wherein the rotor transmission ring is accommodated in the second motor stator and the second motor rotor.

5. The direct drive spindle assembly according to claim 1, wherein the second motor rotor is accommodated in the second motor stator.

6. The direct drive spindle assembly according to claim 1, further comprising a first brake structure provided within the first motor rotor.

7. The direct drive spindle assembly according to claim 1, further comprising a second brake structure provided within the second motor rotor.

8. The direct drive spindle assembly according to claim 1, further comprising a first motor stator cooling structure installed inside the hollow housing between the first motor stator and the first rotational axis.

9. The direct drive spindle assembly according to claim 1, further comprising a second motor stator cooling structure installed between the second motor stator and the fork arms of the main fork.

10. A method for manufacturing a direct drive spindle assembly, which is including the following steps:
   providing a main fork which is rotated about a first rotational axis and formed by a base and a parallel pair of spaced fork arms;
   providing a first drive means which is established by a hollow housing concentric with the first rotational axis, a first motor stator and a first motor rotor accommodated in the first motor stator, wherein the first motor rotor coupled with the base of the main fork drives the main fork to rotate about the first rotational axis;
   providing a second drive means which is contained between the fork arms of the main fork and established by a second motor stator concentric with a second rotational axis, a second motor rotor and a rotor transmission ring inside the second motor rotor, wherein the second rotational axis is perpendicular to the first rotational axis and the second motor stator is coupled with the fork arms of the main fork; and
   providing a spindle box having an orthogonal cross-shaped structure wherein a first arm of the spindle box is coupled with the second motor rotor by means of the rotor transmission ring and a second arm of the structure is connected to a spindle head;

which is characterized by that the above-mentioned paired fork arms are assembled to the second drive means before being combined with the base of the main fork.

11. The method of claim 10, wherein the first motor stator and the first motor rotor accommodated in the first motor stator are both accommodated in the hollow housing of the first drive means.

12. The method of claim 10, wherein the fork arms of the main fork comprise respectively an axis hole provided along the direction of the second rotational axis for receiving the second drive means.

13. The method of claim 10, wherein the rotor transmission ring is accommodated in the second motor stator and the second motor rotor.

14. The method of claim 10, wherein the second motor rotor is accommodated in the second motor stator.

15. The method of claim 10, wherein the direct drive spindle assembly further comprises a first brake structure provided within the first motor rotor.

16. The method of claim 10, wherein the direct drive spindle assembly further comprises a second brake structure provided within the second motor rotor.

17. The method of claim 10, wherein the direct drive spindle assembly further comprises a second motor stator cooling structure installed between the second motor stator and the fork arms of the main fork.

18. The method of claim 10, wherein the direct drive spindle assembly further comprises a first motor stator cooling structure installed inside the hollowing housing between the first motor stator and the first rotational axis.

19. The method of claim 10, wherein the second motor stator and the second motor rotor are assembled before being installed between the fork arms of the main fork.

20. A machining center comprising a direct drive spindle assembly and characterized by the direct drive spindle assembly that comprises:

a main fork which is rotated about a first rotational axis and has a base and a parallel pair of spaced fork arms;

a first drive means comprising a hollow housing concentric with the first rotational axis, a first motor stator and a first motor rotor that is accommodated in the first motor stator and is coupled with the base of the main fork for driving the main fork to rotate about the first rotational axis;

a second drive means contained in a room between the fork arms of the main fork and having a second motor stator concentric with a second rotational axis, a second motor rotor and a rotor transmission ring inside the second motor rotor, wherein the second rotational axis is perpendicular to the first rotational axis and the second motor stator is coupled with the fork arms of the main fork; and a spindle box having an orthogonal cross-shaped structure of which a first arm is coupled with the second motor rotor by means of the rotor transmission ring, and of which spindle box a second arm is connected to a spindle head;

wherein the above-mentioned paired fork arms are assembled to the second drive means before being combined with the base of the main fork.

* * * * *